Patented May 5, 1931

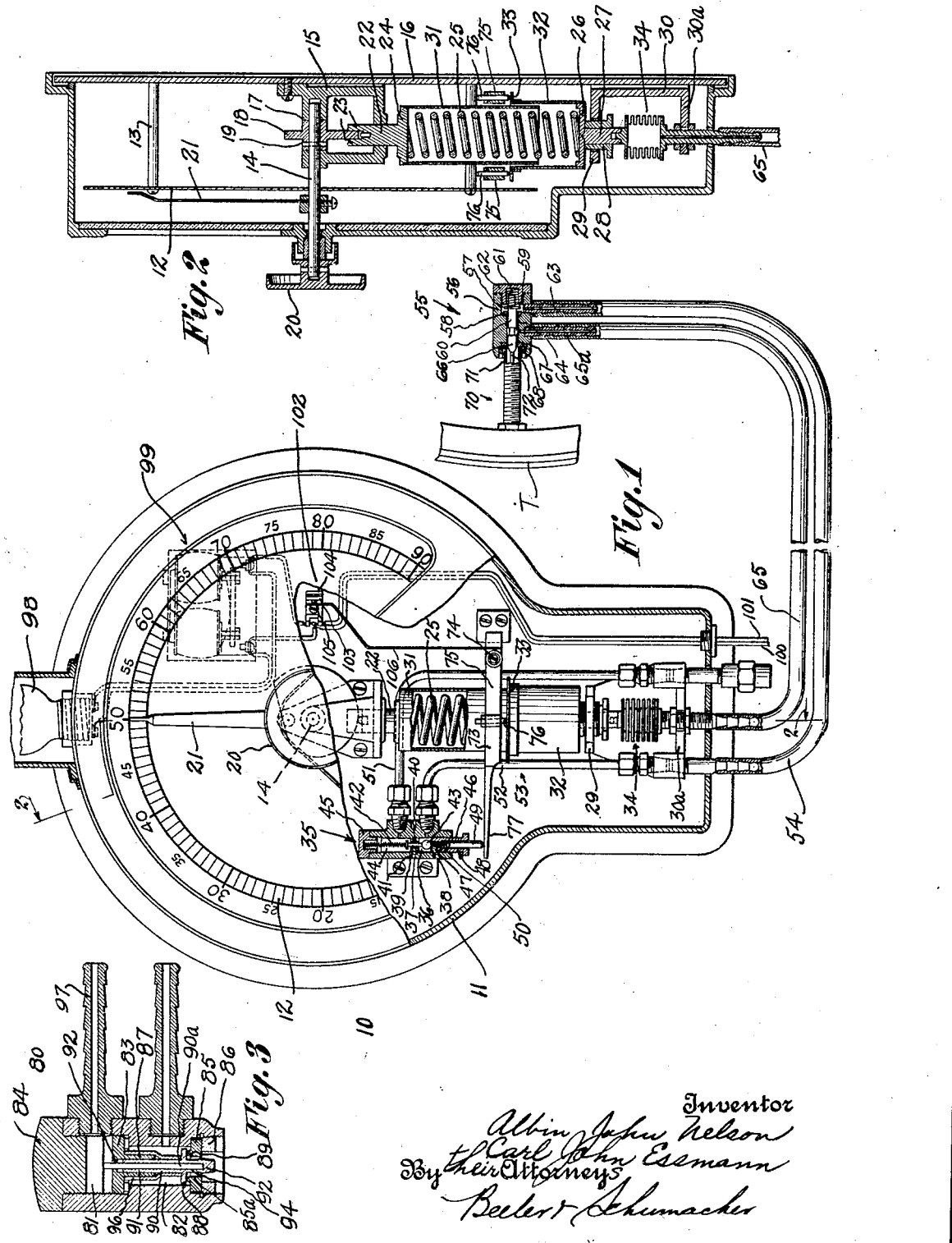

1,803,863

UNITED STATES PATENT OFFICE

ALBIN JOHN NELSON AND CARL JOHN ESSMANN, OF BROOKLYN, NEW YORK

TIRE INFLATING AIR PRESSURE CONTROLLER

Application filed August 20, 1928. Serial No. 300,758.

This invention relates to tire inflating air pressure controllers.

One object of the invention is to provide an improved pneumatic pressure feed and control whereby the pressure in a chamber can be set with accuracy, and the pressure cut off on attaining the required condition in the chamber.

Another object of the invention is the provision of a device of the nature set forth, wherein an improved pressure relief assures safety in the operation of the device and permits pressure to be bled from the chamber should the same be too high.

A further object of the invention is to furnish an improved device of the type mentioned which is particularly applicable for use with tires, and includes a pressure supply conduit and a pressure control conduit both of which can be detachably operatively connected with a conventional tire valve structure.

A further object of the invention is to provide an improved device of the nature set forth having a dial and an adjusting cam for the device mounted in an improved manner.

A further object of the invention is to construct a device of the character described which is of simplified construction, inexpensive to manufacture, and reliable and efficient in use to a high degree.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a front elevation of a device embodying the invention, certain parts being removed and others in section to show interior construction.

Fig. 2 is a central vertical section of the same, taken on line 2—2 of Fig. 1.

Fig. 3 is a view of a detail of the device, showing a modification.

This present invention is particularly applicable in connection with the inflating of tires, although it can be used with various types of pressure containers, and whether the fluid be a liquid or a gas, and within the scope of the invention a tire merely represents a fluid pressure chamber. As hereinafter set forth, the pressure controller is operated directly from the tire, thereby assuring accuracy and minimizing the effects of a pressure drop through the air supply line. The invention also includes a pressure relief or vent to counterbalance any retardation that may obtain due to frictional effects in the fluid pressure and whereby the pressure in the tire might rise above that intended. The said relief is useful as a safety means and prevents injury to the tire by excessive pressure in the event that any part of the device should fail to function for any reason whatever. The invention employs a pressure feed conduit and a pressure control conduit, both of which are flexible, and includes a valve body which is readily engageable with a tire valve structure of any standard type.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device embodying the invention. The same includes an instrument casing 11 having at its upper portion a dial 12 mounted on supports 13. In central relation to the dial is a shaft 14 journaled in a hollow bracket 15 that is mounted on the rear wall 16 of the casing. The said bracket is slotted at 17 to receive a cam 18 through the hub of which the shaft 14 passes. The said cam is pinned to the shaft at 19 to be turned into any desired position by manipulating the knob 20, according to a pointer 21 on the said shaft, which coacts with the dial. It will be understood that the device 10 can be calibrated so that the readings on the dial are true with the cam.

Guided in the bracket 15 for vertical sliding movement, is a follower 22 having arms 23 between which the cam coacts therewith. The said follower terminates at its lower end in a plate 24 which bears against the upper end of a coil spring 25, whose lower ends rest on a plate 26. The latter is mounted on a vertically movable pin 27, which is slidingly guided in a bushing 28 that is screwed into an upper arm 29 of a bracket 30. Sleeves 31, 32 having telescopic relation with each other are mounted on plates 24 and 26 respectively, and inclose the spring 25. The sleeve 32 has mounted thereon a horizontal flange 33 for a purpose hereinafter described. Coacting with the spring 25 is a pneumatic motor 34 which is fixedly mounted at its lower end on arm 30a of the bracket. The motor is expansible upward by pressure therein, against the force of the spring, which has previously been set to the required tension by rotation of the cam 18.

Disposed within the casing 10, is a valve body 35 having a chamber 36 therein, which is provided with a plurality of oppositely arranged, coaxial valve seats 37, and 38. The seat 37 may be formed on a transverse annular guide flange 39, whose opening 40 is central with respect to said valve seat, to slidingly receive a valve actuating rod 41. The latter is operated by a compression coil spring 42 and tends to move a ball valve 43 in the valve chamber into engagement with the seat 38. The spring 42 is mounted in any convenient manner on the valve body 35, preferably in a chamber 44 which communicates with the chamber 36 through the passage 40 at the annular space about the rod 41. Closing the chamber 44 is a plug 45 having a recess for seating the spring. The companion valve seat 38 is formed on a bushing 46 that is screwed into the valve body. The said bushing is formed with a passage 47 central with respect to the seat 38, and is counterbored at 48 to receive a plunger 49 which projects at one end from the bushing, and has at its other end a rod 50 adapted to move the valve 43 from the seat 38 into engagement with the seat 37. To constitute the passages 47 and 48 a vent for the valve chamber 38, the said passages are to an accurately predetermined extent larger than the members received therein, whereby a pressure relief is provided of sufficient capacity to be safe, and yet governed according to a definite time element during which the pressure in the tire is reduced in the event that it is for any cause too high, and during which time element the lag in the device 10 is overcome and the said device sets the pressure in the tire within close limits of pressure.

Communicating with the valve chambers 44 and 36 are inlet and outlet portions 51, 52 respectively of a pressure supply conduit 53. The conduit portion 51 is connected to any suitable source of pressure, while the portion 52 is connected preferably by a hose 54 to an outlet head 55. The latter includes a body 56 having a chamber 57 in which is a resilient valve seat 58 to coact with a valve 59. The latter is formed on a rod 60, and is actuated by a spring 61 into closing position. The valve chamber 57 is closed by a plug 62 that has a central recess in which the spring 61 seats. A nipple 63 communicates with the valve chamber, and readily engages the hose 54. The plunger 60 has an annular recess 64 in spaced relation to the valve 57 and positioned ahead of the same relative to the normal direction of flow of fluid from the hose 54 into the tire T. A nipple 65a communicates with the annular recess 64, and engaged with the nipple is a hose 65 that communicates with the pneumatic motor 34. Taking around the free end 66 of the plunger 60 is a resilient annular member 67 held in place by a locknut 68. The head 55 is engageable with any standard tire valve structure 70, which includes a sleeve 71 and a central valve actuating pin 72. On engaging the head 55 with the sleeve 71 at the gasket 67, the plunger 60 abuts the end of the pin 72, whereby the tire valve structure 70 is opened, and at the same time the valve 57 is displaced, permitting the air in the supply conduit to flow into the tire through the annular space about the plunger 60. This area may be comparatively restricted so that no air will flow into the control conduit 65 until the pressure in the tire has been sufficiently built up to afford back pressure and reduce the velocity of the air.

The operation of the device 10 will now be clearly apparent. On establishing communication with a tire as stated, air flows through the tube 51, thence into chamber 44, through the passage 40 and into the chamber 36. Thence it flows through the outlet portion 52 of the pressure supply conduit into the head 55. When the pressure in the tire has been built up, the air pressure at the tire actuates the motor 34. The latter produces a deflection in the spring 25, causing an upward movement of the flange 33. This in turn moves a lever 73 which is pivotally mounted at 74 and includes a yoke, the arms 75 of which take around the sleeve 31, and are provided with adjustable set screws 76 for engaging the flange 33. The free end 77 of the lever actuates the plunger 49 to cause the ball valve 43 to engage valve seat 37 thus closing the pressure supply conduit 53 between the portions 51 and 52 thereof. If there is any lag in the operation of the device 10, due to the time required for the pressure to flow through the control conduit 65 to the motor 34 to energize the same, the pressure in the tire may slightly exceed what the device has been set for. This, however, is taken care of by conduit 52, which bleeds pressure from the tire, and discharges into the valve chamber 36, and thence out through vent passages 47, 48. The pressure in the tire may then fall, whereby the motor 34 permits the lever 77 to drop and the ball valve 43 to close the seat 38 and establish communications between the portions 51, 52 of the supply conduit, so that pressure again flows into the tire. This variation in pressure produced by what is known as "hunting" of the device, is very slight. If the tire has been previously filled with air, and the proper pressure exceeded, the device 10 will serve to reduce the pressure to the desired pressure. In that case, on establishing communication between the tire and the head 55, no pressure will flow into the tire, but pressure will be vented therefrom. The subsequent operation of the instrument will be exactly as hereinbefore described in connection with the inflating of tires. On removing the head 53 from the tire valve, the valve 57 automatically closes the pressure supply conduit.

It will be noted that, because of its pressure relief feature, the device 10 provides for a high degree of safety in the use thereof, and that the tire can not be burst due to failure of the said device to operate, as, for example, if the motor 34 should break.

In Fig. 3 is shown a modified construction for the head 55. This takes the form of a head 80, and is provided with a plurality of valve chambers 81, 82, separated by a disc 83 threaded into the chamber 81. The latter is closed by a plug 84, while the other has at its opening a resilient annular gasket 85 held in place by a lock member 86. The disc 83 has a central sleeve 87 projecting therefrom into the valve chamber 82. Co-acting with the gasket 85 is a valve 88 which is adapted to seat at 89 on the said gasket. The said valve includes an elongated tubular stem 90 having a passage 90a, and extending to both sides thereof at 91 and 92. The portion 91 has telescopic engagement with the sleeve 87 and communicates with the chamber 81 through an opening 92 in the disc 83. The portion 92 extends through the opening 85a in the gasket 85, for co-operation with a pin 72 of a tire valve. The portion 92 is preferably closed at its end, but has a laterally extending passage 94 affording communication between the passage in the tubular stem 91 and the region in proximity thereto, and within the valve seat 89. The passage 94 may incline slightly in the direction of normal flow of the air from nipple 95 and into the tire. A tubular member 96 of elastic material extends over the members 87 and 90 to afford an air tight connection therebetween. The member 96 is deformable to permit the tube 90 to move inward in the sleeve 87 so that the valve 88 may open. When the pressure in the tire has been built up, pressure flows through passages 94 and 90a into chamber 81, and thence through nipple 97 into the pressure control conduit, as hereinbefore set forth.

The invention may include additional indicating means to effectively notify the operator when the tire has been properly inflated. The indicating means referred to may take the form of a lamp 98 and a bell 99, either or both of which may be used. The indicating means is preferably electrically operated, being connected in circuit in a well known manner to receive current from outgoing wires 100 and 101. The circuit is closed or opened by a device 102 which is mounted within the instrument casing and includes a plurality of normally spaced contacts 103 and 104. The latter is preferably rigid, while the former is of any well known spring type and includes an insulating button 105 adapted to engage an arm 106 which is connected to the lever 73 for movement therewith. It will now be clear that when the tire has been brought up to the required pressure, the lever 73 swings upward, throwing the arm 106 to the right and closing the circuit through the device 102 whereby a lamp is lit or a signal sounded as the case may be.

It will thus be seen that I have provided a device which fulfills the several objects of the invention and is well adapted to meet the conditions of practical use.

We claim:

1. A tire inflating air pressure controller, including a pressure supply conduit, and a pressure control conduit, a valve for the pressure supply conduit, a pneumatic motor for the pressure control conduit, a body with which said conduits communicate, said body having a valve automatically closing the pressure supply conduit, said valve being opened on engaging the body with the tire valve structure, to permit pressure to flow into the tire, said motor closing the first mentioned valve when the required pressure in the tire has been attained, and a vent opened by the first mentioned valve as the same closes the pressure supply conduit.

2. A tire inflating air pressure controller, including a pressure supply conduit, and a pressure control conduit, a valve for the pressure supply conduit, a pneumatic motor for the pressure control conduit, a body with which said conduits communicate, said body having a valve automatically closing the pressure supply conduit, said valve being opened on engaging the body with the tire valve structure, to permit pressure to flow into the tire, said motor closing the first mentioned valve when the required pressure in the tire has been attained, and means opened by the first mentioned valve to relieve pressure in the pressure supply conduit when the first mentioned valve is closed as aforesaid.

3. In a device of the character described, a pneumatic, expansible motor set to a given pressure, a conduit to carry an air supply under pressure to a tire, means affording communication between said tire and said motor, means including a valve actuated by the motor to stop the flow of air through the conduit into the tire when the pressure in the tire operates the motor, and vent means for relieving the air supply pressure to the tire, said valve opening the vent means on stopping the flow of air as aforesaid.

4. In a device of the character described, a valve having an inlet, connected to an air pressure supply, an outlet adapted to connect with a tire, and a vent for relieving the air pressure supply, means for establishing communication between said inlet and outlet on closure of said vent and for cutting off said communication on opening the vent, and air pressure actuated means connected with said supply and including a single valve and motor for controlling said first mentioned means.

5. In a device of the character described, a valve having an inlet connected to an air pressure supply, an outlet adapted to connect with a tire, and a vent for relieving the air pressure supply, means for establishing communication between said inlet and outlet on closure of said vent and for cutting off said communication on opening the vent, a single air pressure actuated means connected with said supply for controlling said first mentioned means, and means for adjusting said actuated means to operate said first mentioned means at a predetermined air pressure.

In testimony whereof we affix our signatures.

ALBIN JOHN NELSON.
CARL JOHN ESSMANN.